Jan. 27, 1970
R. SCHRAG
3,491,533
INTERNAL COMBUSTION ENGINE AFTERBURNER
AND AIR SUPPLY SYSTEM
Filed Sept. 12, 1967
2 Sheets-Sheet 1
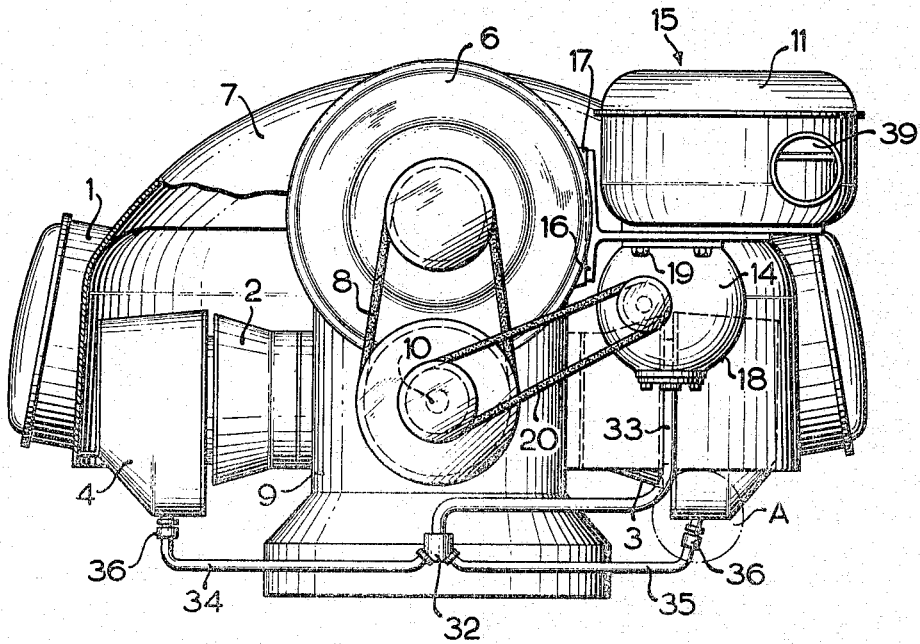
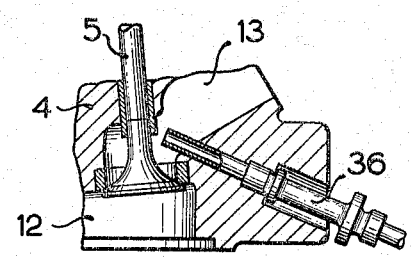
INVENTOR
Rolf SCHRAG
By
*Craig & Antonelli*
his ATTORNEYS INVENTOR
Rolf SCHRAG
By

*Craig & Antonelli* his ATTORNEYS

United States Patent Office 3,491,533
Patented Jan. 27, 1970

3,491,533
INTERNAL COMBUSTION ENGINE AFTER-BURNER AND AIR SUPPLY SYSTEM
Rolf Schrag, Stuttgart-Unterturkheim, Germany, assignor to Firma Dr. Ing. H.c.F. Porsche KG, Stuttgart-Zuffenhausen, Germany
Filed Sept. 12, 1967, Ser. No. 667,128
Claims priority, application Germany, Oct. 7, 1966, 1,294,397
Int. Cl. F01n 1/14, 3/02
U.S. Cl. 60—30                    8 Claims

ABSTRACT OF THE DISCLOSURE

An internal combustion engine afterburner and air supply system where the combustion air is supplied to the combustion chambers through air filters and the secondary air for the afterburning is supplied by a blower directly toward the exhaust valves by air discharge nozzles extending into the exhaust conduits, wherein the suction side of the blower is connected directly to the clean air chamber of the air filter and the blower directs high pressure air directly to the exhaust conduits to by pass the combustion chambers. The air filter and blower are rigidly connected together as a single unit with the suction side of the blower being connected to the clean air space of the air filter by a tube extending concentrically through the air filter element and the damping chamber of the air filter and by an intermediate conduit extending through a support bracket mounting the unit. A tension bolt extends through the support bracket and tube to rigidly secure them together. The blower is a gear blower and rigidly connected directly to the support bracket.

BACKGROUND OF THE INVENTION

Afterburning arrangements are known wherein an air pump or blower supplies secondary air into the exhaust conduits and an air filter is provided at the suction side of the blower for filtering the combustion air as well as filtering the secondary air. This provision results, in combination with the independent support and attachment of the air pump, by the air filter, in considerable difficulty of construction and additional expenses, both causing the engine cost to increase.

SUMMARY OF THE INVENTION

It is an object of the present invention to avoid the above-mentioned disadvantages and provide a satisfactory afterburner and air supply system for an internal combustion engine. The suction side of the blower for the secondary air is connected "in shunt" to the clean air chamber of the air filter for the combustion air. By this means, a separate filtering arrangement for the secondary air is avoided and, at the same time, a further advantage is gained in that the suction noises of the blower are subdued by the air filter of the combustion air so that the noise level of the engine is not increased by the addition of an afterburner. The engine contruction is simplified when the air filter and the blower are combined into a single rigid unit and the supply of secondary clean air is accomplished through a tube extending concentrically through the air filter and by an intermediate passageway in a support bracket mounting the blower-air filter unit. At the same time, a closed suction system is obtained wherein freely extending suction pipes are avoided. The air filter is tightly secured to the support bracket by means of a tension bolt extending through the air guide tube and secured to the support bracket to produce a compact and space saving assembly for simple fastening to the engine housing. Preferably, the air blower is a gear blower driven from the engine crankshaft through a power train and is provided with a housing rigidly connected to the support bracket. When compared with known arrangements wherein the pump is fastened to a moxable mounting, the assembly of the present invention provides a blower or pump mounting that is free of vibrations, which facilitates the installation of pressure lines to the pump. Adjustment of the drive train for the pump may be accomplished by known means when a pulley-belt type of arrangement is used. Further objects, features and advantages of the present invention will become more clear from the following detailed description of the drawing.

BRIEF DESCRIPTION OF THE DRAWING

FIGURE 1 is a front elevation view of a preferred embodiment of the present invention employed with an air-cooled "Boxer" type of engine;

FIGURE 3 is a partial cross-sectional view through a portion of the exhaust conduit of the internal combustion engine in the area of A of the cylinder head as shown in FIGURE 1 showing the specific arrangement for the discharge nozzle of the secondary air.

DETAILED DESCRIPTION OF THE DRAWING

Figure 2:
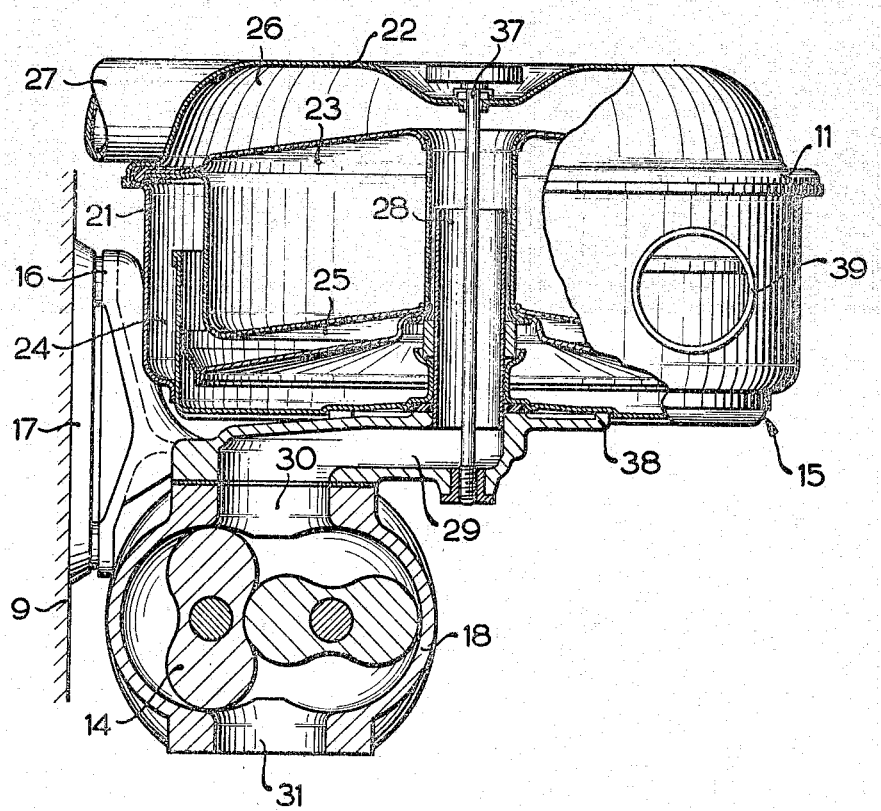
FIGURE 2 is a partial cross-sectional view of the unit compressing the air filter, support bracket and blower for the secondary air.

As shown in FIGURE 1, the internal combustion engine 1 has working cylinders 2 and 3 arranged oppositely with respect to each other and each having cylinder heads 4, which contain the valves for the control of the gas-charging process. The valves per se are of conventional construction with only one exhaust valve 5 being shown in FIGURE 3. The working cylinders 2, 3 are cooled by air supplied by an axial blower 6 and a canopy shaped air directing hood 7, which is partially in cross-section at the left hand side to show the general shape of the cylinder 2 and head 4. The air blower 6 is driven by means of a belt 8 drivingly connecting a pulley on the crankshaft 10 and a pulley on the blower axle. The crankshaft 10 is suitably supported by the crankcase housing 9. An air filter 11 provides clean combustion air for the operation of the engine to the combustion chamber 12 (FIGURE 3) and clean secondary air for the afterburning of the exhaust gases to the exhaust conduit 13 through the pumping of the roots blower 14. The air filter 11 and roots blower 14 are rigidly combined into one single unit 15 and fastened to a common mounting bracket 16 that is rigidly attached to a flange 17 of the crankcase 9 at the height or level of the axial air blower 6. The housing 18 of the blower 14 is fastened to the mounting bracket 16 by means of screws 19. An additional V-belt 20 with cooperating pulleys is used to drive the blower 14 from the crankshaft 10.

As more clearly shown in FIGURE 2, the air filter 11 consists in a known manner, of a cylindrical cup-shaped upwardly opening housing 21, a tightly abutting cover 22 and a filter element 23 held therebetween. The housing 21 surrounds a raw air receiving chamber 24 and a damping chamber 25 from which the raw air is supplied to the filter element 23. After passing through the filter element 23, the air is discharged into a clean air chamber 26 that is in the upper portion of the air filter and defined by the cover 22 and air filter element. The conduit 27 enters transversely into the clean air chamber 26 to supply clean air for the combustion process to the combustion chambers, for example, through a conventional carburetor or carburetors. An air tube 28 terminates at its upper end in the clean air chamber 26 and extends centrally through the filter element 23 and the damping chamber 25. The tube 28 is constructed as a sleeve that is inserted at its lower end into a passageway 29 of the support bracket 16. The suction side 30 of the blower 14 is connected to the passageway 29 of the bracket 16 to receive clean air. As shown in FIGURES 1 and 2, the high pressure discharge side 31 of the blower 14 is connected to an air divider head 32 by means of the air line 33. Pressure lines 34 and 35, corresponding to the number of combustion chambers, branch off from the air divider head 32. Each of the pressure lines 34, 35 is connected to a discharge nozzle 36 (only one being shown in FIG. 3) that terminates for discharge of clean secondary air into the exhaust conduit 13 directly toward the stem of the exhaust valve 5. A tension bolt 37 extends through the air tube 28 and is provided with a head engaging the air filter cover 22 at one end and a screw thread threadingly engaging the support bracket 16 at its other end. A plurality of projections 38 are provided on the support bracket 16 for supporting the air filter 11.

During operation of the engine, the raw air flows through the air intake 29 of the air filter into the raw air chamber 24, into the damping chamber 25, through the air filter element 23, and into the clean air chamber 26. From the clean air chamber 26, a portion of the clean air flows through the conduit 27 to the individual carburetors. At the same time, another portion of the clean air within the clean air chamber 26 is drawn by the blower 14 for supplying to the exhaust conduits as secondary air required for exhaust gas afterburning. The secondary air flows through the air guide tube 28, the passageway 29 of the support bracket 16, through the blower 14, through lines 33–35, and through nozzle 36 to be blown toward the exhaust valve 5.

A preferred embodiment of the present invention has been disclosed in detail for purposes of illustration; further embodiments, modifications and variations are contemplated.

I claim:
1. An afterburner and air supply system for an internal combustion engine having combustion chambers and exhaust sytsem for an internal combustion engine having combustion chambers and exhaust conduits for the chambers, comprising: an air filter having an air intake and a clean air chamber; conduit means connected to said filter clean air chamber for supplying air to the combustion chambers; blower means receiving clean air from said filter clean air chamber and discharging high pressure clean air into the combustion chamber exhaust conduits bypassing the combustion chambers, wherein said air filter and said blower means are rigidly secured together as a single unit; said air filter includes an annular air damping chamber and a filter element for removing impurities from air passing therethrough, a tube concentric with said damping chamber extending through said air filter element conducting clean air to said blower means, and support bracket means having an air passage connecting said tube and the suction inlet of said blower means forming the mounting means for said filter and said blower means units.

2. The device of claime 1, wherein said support bracket means includes a support portion engaging said air filter from beneath it and a tension bolt extending through said tube and rigidly fastening said air filter to said support means support portion.

3. The device of claim 2, wherein said blower means includes a gear pump having drive means for connection to the output shaft of the internal combustion engine; said blower means having a housing rigidly secured directly to said support means.

4. The device of claim 3, wherein said air filter has an axis of symmetry coaxial with said tube and said tension bolt; said air filter includes a cup shaped upwardly opening housing having said dampening chamber in the bottom portion thereof, an annular filter element in its central portion and a cover defining with said filter said clean air chamber in the upper portion of said filter; said tube opening into said clean air chamber.

5. The device of claim 4, wherein said conduit means extends directly between said clean air chamber and said combustion chamber inlets, and opens into said clean air chamber transverse to said filter axis of symmetry.

6. The device of claim 2, wherein said air filter has an axis of symmetry coaxial with said tube and said tension bolt; said air filter includes a cup shaped upwardly opening housing having said dampening chamber in the bottom portion thereof, an annual filter element in its central portion and a cover defining with said filter said clean air chamber in the upper portion of said filter; said tube opening into said clean air chamber.

7. The device of claim 6, wherein said conduit means extends directly between said clean air chamber and said combustion chamber inlets and opens into said clean air chamber transverse to said filter axis of symmetry.

8. The device of claim 1, wherein said blower means includes a gear pump having drive means for connection to the output shaft of the internal cambustion engine; said blower means having a housing rigidly secured directly to said support means.

References Cited

UNITED STATES PATENTS

| | | | |
|---|---|---|---|
| 3,213,608 | 10/1965 | Littell | 60—30 |
| 3,299,629 | 1/1967 | Bouchard | 60—30 |
| 3,116,596 | 1/1964 | Boehme | 60—30 |
| 3,364,677 | 1/1968 | Ernst | 60—30 |
| 3,401,518 | 9/1968 | McWhirter | 60—30 |

MARK NEWMAN, Primary Examiner

DOUGLAS HART, Assistant Examiner